United States Patent
Youill et al.

(10) Patent No.: US 8,645,498 B2
(45) Date of Patent: Feb. 4, 2014

(54) TRANSACTION PROCESSING SYSTEM

(75) Inventors: Matthew Peter Youill, London (GB); Matthew James Carter, Hampshire (GB); Asher Torrence Glynn, London (GB); Joseph Edward Stapleton, Surrey (GB)

(73) Assignee: The Sporting Exchange Ltd., London (GB)

( * ) Notice: Subject to any disclaimer, the term of this patent is extended or adjusted under 35 U.S.C. 154(b) by 868 days.

(21) Appl. No.: 12/518,715

(22) PCT Filed: Dec. 12, 2007

(86) PCT No.: PCT/EP2007/063842
§ 371 (c)(1),
(2), (4) Date: Dec. 28, 2009

(87) PCT Pub. No.: WO2008/071748
PCT Pub. Date: Jun. 19, 2008

(65) Prior Publication Data
US 2010/0115059 A1    May 6, 2010

(30) Foreign Application Priority Data

Dec. 12, 2006 (EP) ................... 06125974

(51) Int. Cl.
*G06F 15/16* (2006.01)
(52) U.S. Cl.
USPC ............ 709/219; 709/227; 709/203; 709/232
(58) Field of Classification Search
USPC .............. 709/219, 227, 203, 232; 705/30, 35; 463/39, 25, 20
See application file for complete search history.

(56) References Cited

U.S. PATENT DOCUMENTS

| | | | |
|---|---|---|---|
| 7,155,600 B2* | 12/2006 | Burky et al. | 712/229 |
| 2003/0120720 A1* | 6/2003 | Montero | 709/203 |
| 2004/0194096 A1* | 9/2004 | Armstrong et al. | 718/100 |
| 2005/0038937 A1 | 2/2005 | Jason et al. | |
| 2005/0050203 A1* | 3/2005 | Chattopadhyay et al. | 709/227 |
| 2005/0138622 A1* | 6/2005 | McAlpine et al. | 718/100 |

(Continued)

FOREIGN PATENT DOCUMENTS

| | | |
|---|---|---|
| JP | 2002-132698 | 10/2002 |
| JP | 2004-305270 | 4/2004 |
| JP | 2004-513409 | 4/2004 |
| WO | WO 01/83058 | 11/2001 |

OTHER PUBLICATIONS

"Use Guide for Distributed Transaction Processing Function TP1/Server Base Enterprise Option, Exposition/Approaches/Grammar/Operating Manual 3000-3-982-30", 4th Edition, Sep. 2006, Hitachi Ltd., pp. 1 to 17, 19 to 22, and 43 to 48.

(Continued)

*Primary Examiner* — Wing F Chan
*Assistant Examiner* — Benjamin M Thieu
(74) *Attorney, Agent, or Firm* — Ropes & Gray LLP

(57) ABSTRACT

A method of transaction processing in a system comprising a plurality of distributed nodes, the method comprising the steps of receiving a message at a first node, the message defining an operation to be performed on data associated with an entity, queuing the message for processing by a message handler running on the node, permitting the message handler to process the message, in the event that no other message handler is operating on the data and forwarding the message to a second node for subsequent processing.

37 Claims, 12 Drawing Sheets

(56) References Cited

U.S. PATENT DOCUMENTS

2007/0136817 A1*  6/2007  Nguyen ........................ 726/26
2008/0096659 A1*  4/2008  Kreloff et al. .................. 463/39

OTHER PUBLICATIONS

Kleiman et al., translated by Shinichi Iwamoto, "Practical Multithread Programming", 1st Edition, Mar. 31, 1998, ASCII Media Works, pp. 244 to 248 and 358 to 361, ISBN: 4-7561-1784-8.

Nakakawaji, Tetsuo, "OSI and UNIX, Technical Exposition of Distributed Transaction Processing", 1st Edition, Nov. 10, 1994, Soft Research Center Inc., pp. 27 to 30 and 39 to 43, ISBN: 4-915778-45-2.

English Translation of Japanese Office Action dated Mar. 21, 2012, Japanese Application No. 2004-540768.

International Search Report dated Jul. 8, 2008, PCT Application No. PCT/EP2007/063842.

* cited by examiner

TRANSACTION PROCESSING SYSTEM

RELATED APPLICATIONS

This application is a national stage filing under 35U.S.C. 371 of International Application No. PCT/EP2007/063842, filed Dec. 12, 2007, which claims the benefit of European Application No. 06125974.3 filed Dec. 12, 2006, the specifications of which are incorporated by reference herein. International Application No. PCT/EP2007/063842 was published under PCT Article 21(2) in English.

The present invention relates to transaction processing, particularly, but not exclusively, to a method and apparatus for processing betting transactions.

Transaction processing systems find applications in many different environments, including stock exchange systems, travel reservation systems and betting systems such as online betting exchanges. As the demand for high-speed transaction processing systems increases, conventional systems will struggle to provide the processing rates required.

According to the invention, there is provided a method of transaction processing in a system comprising a plurality of distributed nodes, in which data is held in a plurality of data partitions, data in respective partitions being associated with respective single ones of the nodes, the system comprising a plurality of controllers for controlling a group of data partitions, each controller comprising a plurality of write stages for performing operations on the data in the data partitions and a thread manager for allocating threads of execution to the write stages, wherein the thread manager is arranged to allocate at most a single thread for operating on data in a given data partition, the method comprising the steps of receiving a message at a first one of the plurality of controllers, the message defining an operation to be performed on data associated with a given data partition, queuing the message for processing by one of the plurality of write stages and permitting the write stage to process the message, in the event that a thread of execution is available for the given data partition.

According to the invention there is further provided apparatus for transaction processing in a system comprising a plurality of distributed nodes, in which data is held in a plurality of data partitions, data in respective partitions being associated with respective single ones of the nodes, the system comprising a plurality of controllers for controlling a group of data partitions, each controller comprising a plurality of write stages for performing operations on the data in the data partitions and a thread manager for allocating threads of execution to the write stages, wherein the thread manager is arranged to allocate at most a single thread for operating on data in a given data partition, the apparatus comprising a receiver to receive messages at a first one of the plurality of controllers, the messages defining operations to be performed on data associated with a given data partition and a plurality of write stages for processing the messages, wherein a write stage is arranged to process one of more messages in the event that a thread of execution is available for the given data partition and in the event that a thread of execution is not available, the apparatus being arranged to place the messages in a queue.

According to another aspect of the present invention, there is provided a method of transaction processing in a system comprising a plurality of distributed nodes, the method comprising the steps of receiving a message at a first node, the message defining an operation to be performed on data associated with an entity, queuing the message for processing by a message handler running on the node, permitting the message handler to process the message in the event that no other message handler is operating on the data, and forwarding the message to a second node for subsequent processing.

The message handler comprises a plurality of first message handlers handling read only requests and a plurality of second message handlers handling read-write requests, wherein the plurality of read only requests are runnable in parallel.

The plurality of read only requests may be runnable to operate on the data associated with an entity only if a read-write request is not operating on said data. Only a single read-write request may be runnable on the data associated with an entity at a given time.

The method may comprise journaling the received message on receipt.

The method may comprise batching the message with a plurality of other received messages. The batching may be dependent on the processing stage at which it is performed. The batching may be performed in accordance with at least one of network latency, disk latency and the entity to be processed.

A message handler may be associated with a plurality of entities, and the method may further comprise grouping the messages in accordance with the message handler to which the messages are destined.

Data relating to the plurality of entities associated with the message handler may be stored at a single one of the nodes. Data relating to a single entity may be stored at a single one of the nodes.

The entity may comprises an account associated with a user or may comprise a market on which a plurality of users can place bets.

The message may be transmitted asynchronously.

The nodes may comprise servers.

According to the invention, there is further provided apparatus for transaction processing in a system comprising a plurality of distributed nodes, the apparatus comprising means for receiving a message at a first node, the message defining an operation to be performed on data associated with an entity, means for queuing the message for processing by a message handler running on the node, means for permitting the message handler to process the message, in the event that no other message handler is operating on the data and means for forwarding the message to a second node for subsequent processing.

The apparatus may further comprise a thread manager for allocating a single thread to a message handler operating on a single account or a single market and may further comprise a pre-processor for processing messages that affect a plurality of message handlers. The pre-processor may be arranged to generate a single message stream from multiple journal message streams.

The apparatus may further comprise means for resending messages from a first node to a second node in response to a notification that a message has not been received.

The apparatus may further comprise a cluster of data distributors for serving heavily requested data.

Embodiments of the invention will now be described, by way of example, with reference to the accompanying drawings, in which.

Figure 2:
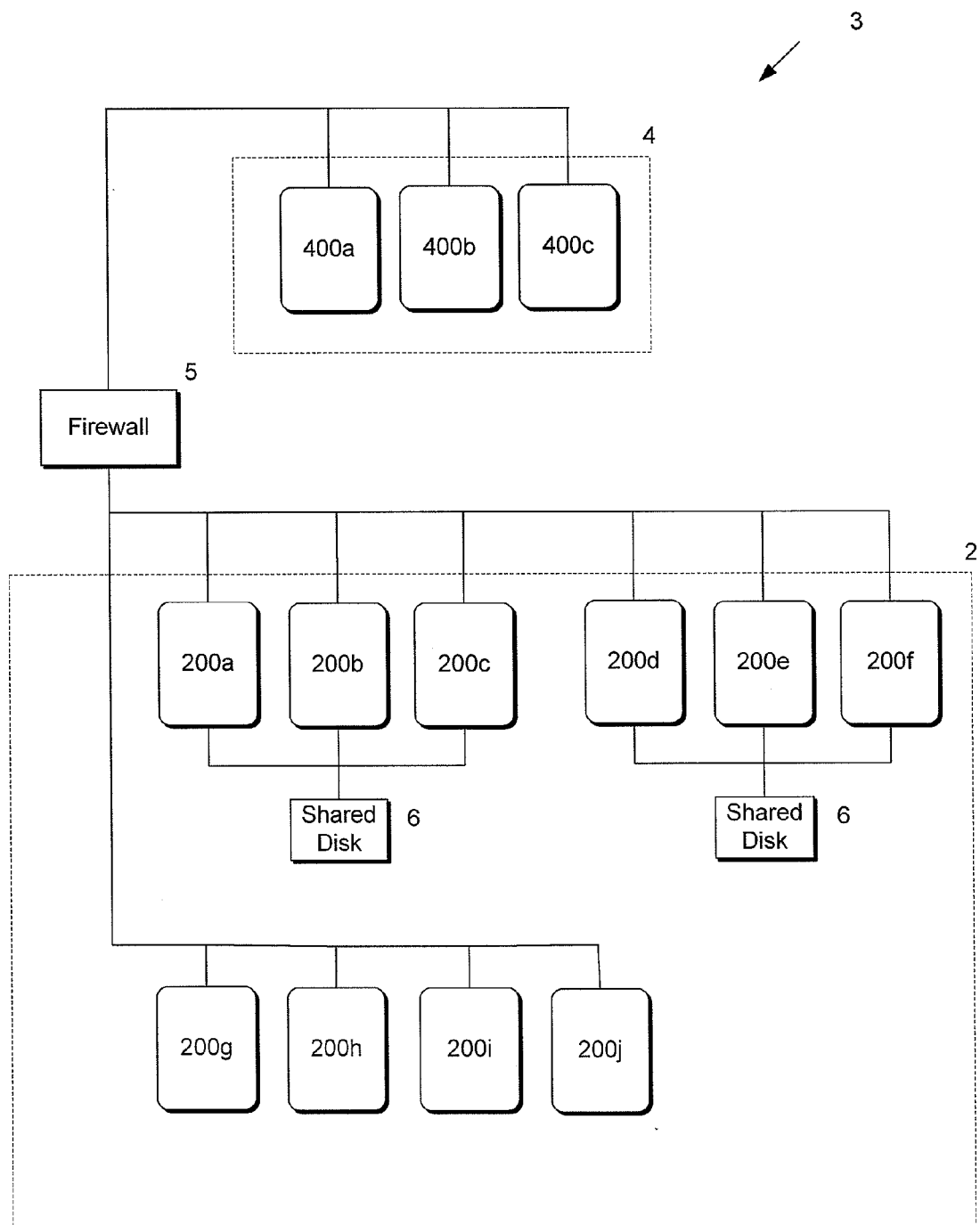
FIG. 2 is a schematic diagram illustrating a transaction processing system in the context of a betting exchange system.
Figure 9:
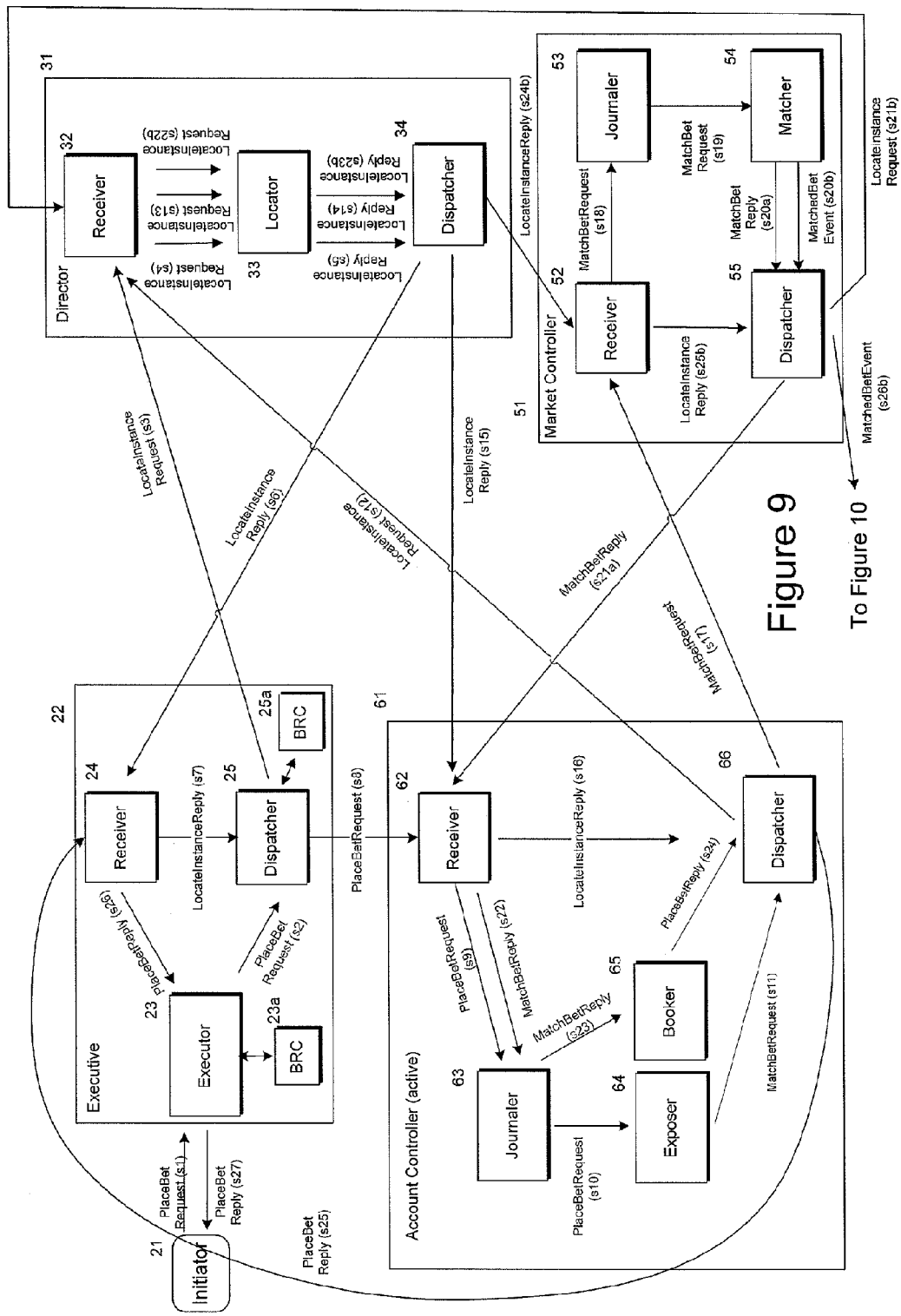
Figure 10:
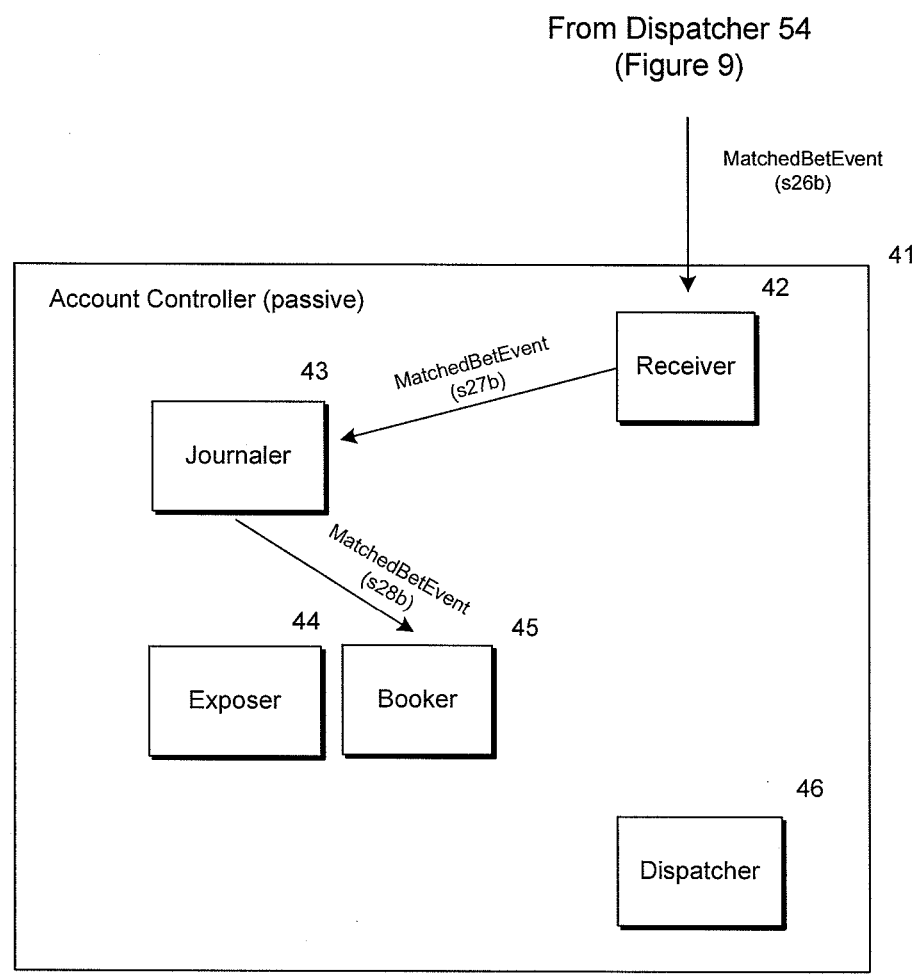
Figure 11:
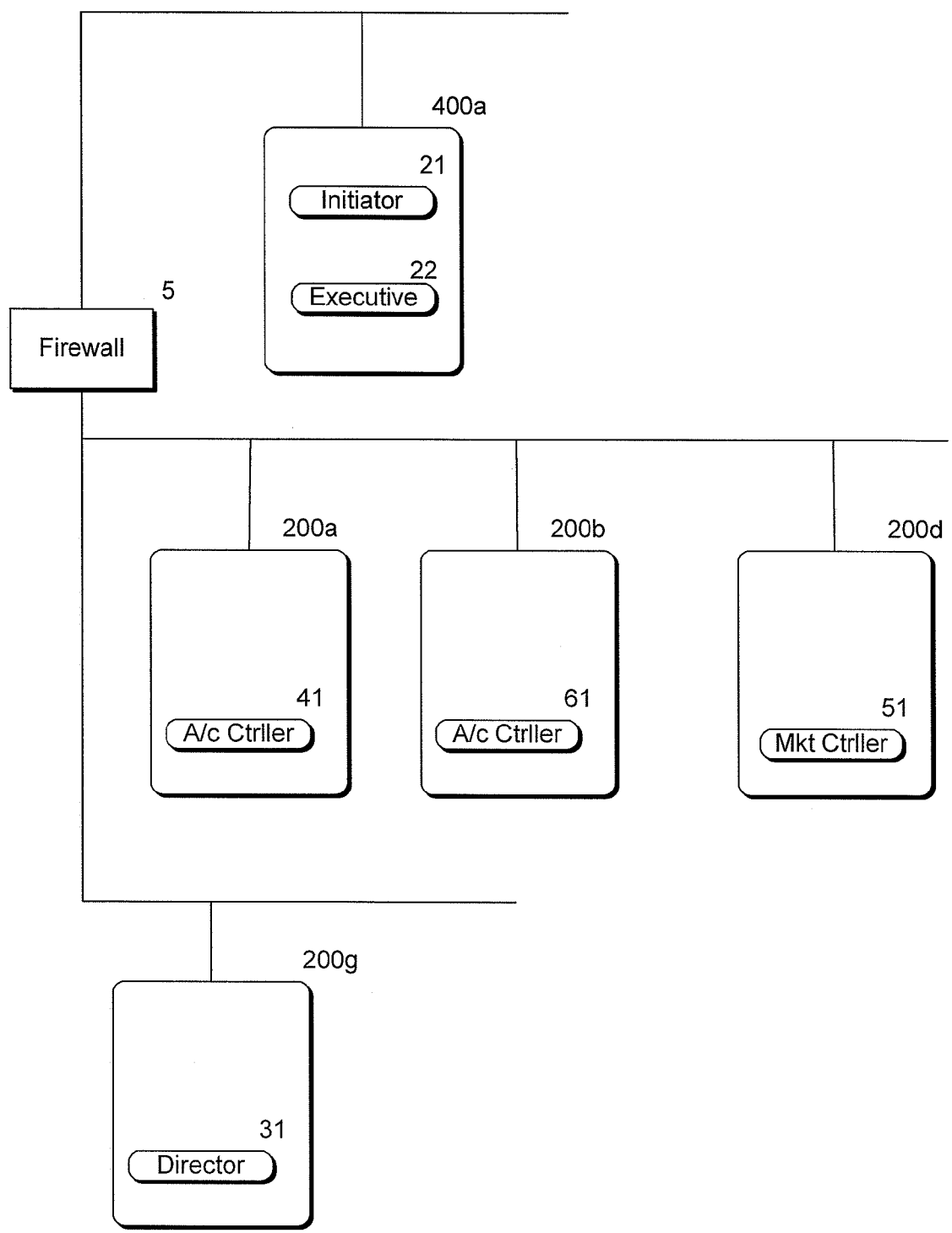

FIGS. 9 and 10 illustrate a second flow of transactions through the transaction processing system according to the invention, and a matching process involved in matching first and second bets together; and FIG. 11 is a schematic diagram illustrating instances of the transaction processing modules running on the servers shown in FIG. 2 to permit the flow of transactions illustrated in FIGS. 9 and 10.

Figure 1:
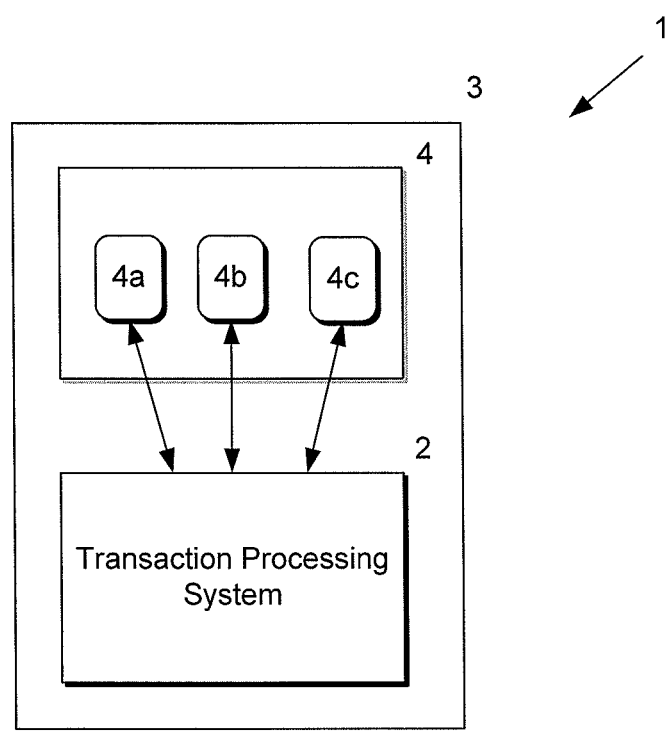
FIG. 1 is a schematic diagram of a general transaction processing environment.

FIG. 1 illustrates a general transaction processing environment 1. A transaction processing system 2 is part of a larger functional system 3 that communicates with other systems, applications or users via a client interface 4. The client interface module 4 may have multiple sub-systems 4a, 4b, 4c for receiving transaction information from different sources and for passing relevant transaction information to and from the transaction processing system 2. The transaction processing system 2 processes transactions in accordance with the requirements of the particular functional system 3. For example, the functional system may be a stock exchange system in which the transaction processing system matches bids and offers, or a banking system in which the transaction processing system processes credits and debits.

FIG. 2 illustrates the transaction processing system 2 in the context of a betting exchange system 3. The betting exchange system is configured to match opposing bets as described, for example, in UK patent application GB 2356071A.

The betting exchange system 3 comprises a client interface module 4 and the transaction processing system 2, linked through, for example, a firewall 5. The client interface module 4 comprises a plurality of servers 400, referred to herein as client interface servers, that deal with incoming and outgoing communication with clients. Clients may be server applications that interface to the various systems that make up the betting exchange and provide the bet transaction requests to the transaction processing system. The client interface servers 400 are configured to receive bets and/or associated betting information request messages placed by users, and to inject corresponding request messages into the transaction processing system 2. The client interface servers 400 may also receive, for example, request messages from users to view their available-to-bet account balance or request messages from users to view all of their currently active bets. The client interface servers 400 are also configured to receive messages from the transaction processing system 2 and return corresponding messages to users. The client interface servers are also individually referred to herein as servers 400a . . . n.

The transaction processing system 2 is highly distributed over a plurality of networked servers 200, referred to herein as transaction processing servers, and is adapted to receive messages from the client interface servers 400. Distributing the transaction processing system 2 over a plurality of servers 200 means that, if required, the system can be easily and cost-effectively scaled by adding further servers.

Figure 3:
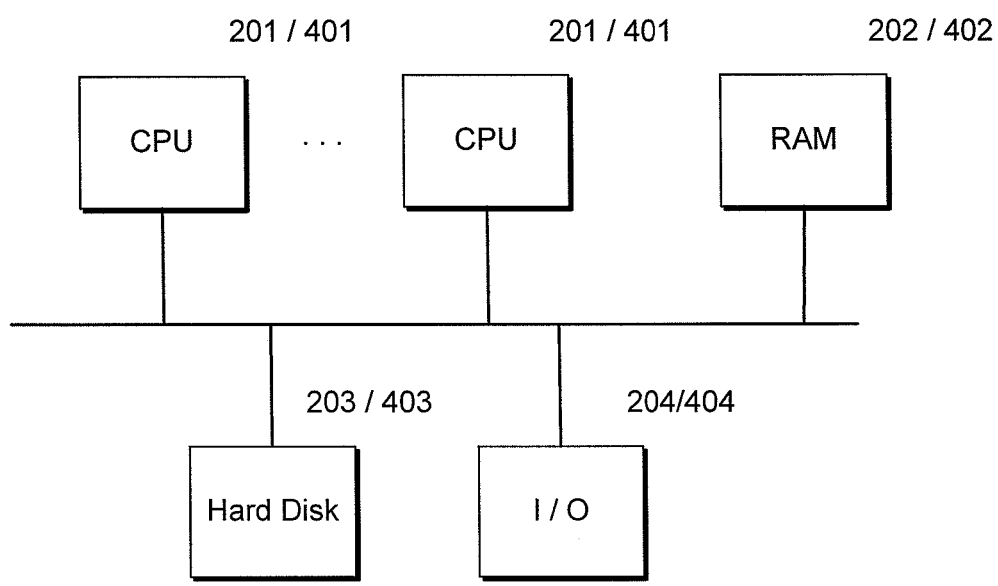
FIG. 3 is a schematic diagram illustrating the components of a server shown in FIG. 2.

Referring to FIG. 3, each transaction processing server 200 and each client interface server comprises at least one processor 201/401, memory 202/402 such as RAM, non-volatile memory 203/403, such as hard disks and an I/O system 204/404 including a network interface. It will be understood by the skilled person that each server has all the components necessary to perform its function. The transaction processing servers are also individually referred to herein as servers 200a . . . n. Groups of transaction servers 200a-c, 200d-f may be associated with respective shared disks 6.

Messages in the transaction processing system 2 may comprise, for example, commands to execute a particular operation, or events detailing a particular occurrence in the transaction processing system 2. For example, a command message may be a request to view a user's available-to-bet account balance, whereas an event message may be a message reporting to the user that their bet has been placed successfully.

In order to achieve a high transaction rate, each server 200 in the distributed system has a degree of data locality, to avoid the overheads associated with network calls to a remote system or disk. This is achieved by partitioning the transaction processing system 2 by user account and by betting market. All information relevant to a single user account is stored on a single server and all information relevant to a single betting market is stored on a single server. This reduces the need for individual servers to make network calls to remote servers or non-volatile storage, for example hard disks, in the network. In this way, latencies in the transaction processing system are reduced and transaction throughput is increased. Wherever possible, data is stored in local memory, or at least low latency memory, thus reducing the need to access high-latency resources such as networked hard disks.

Figure 4:
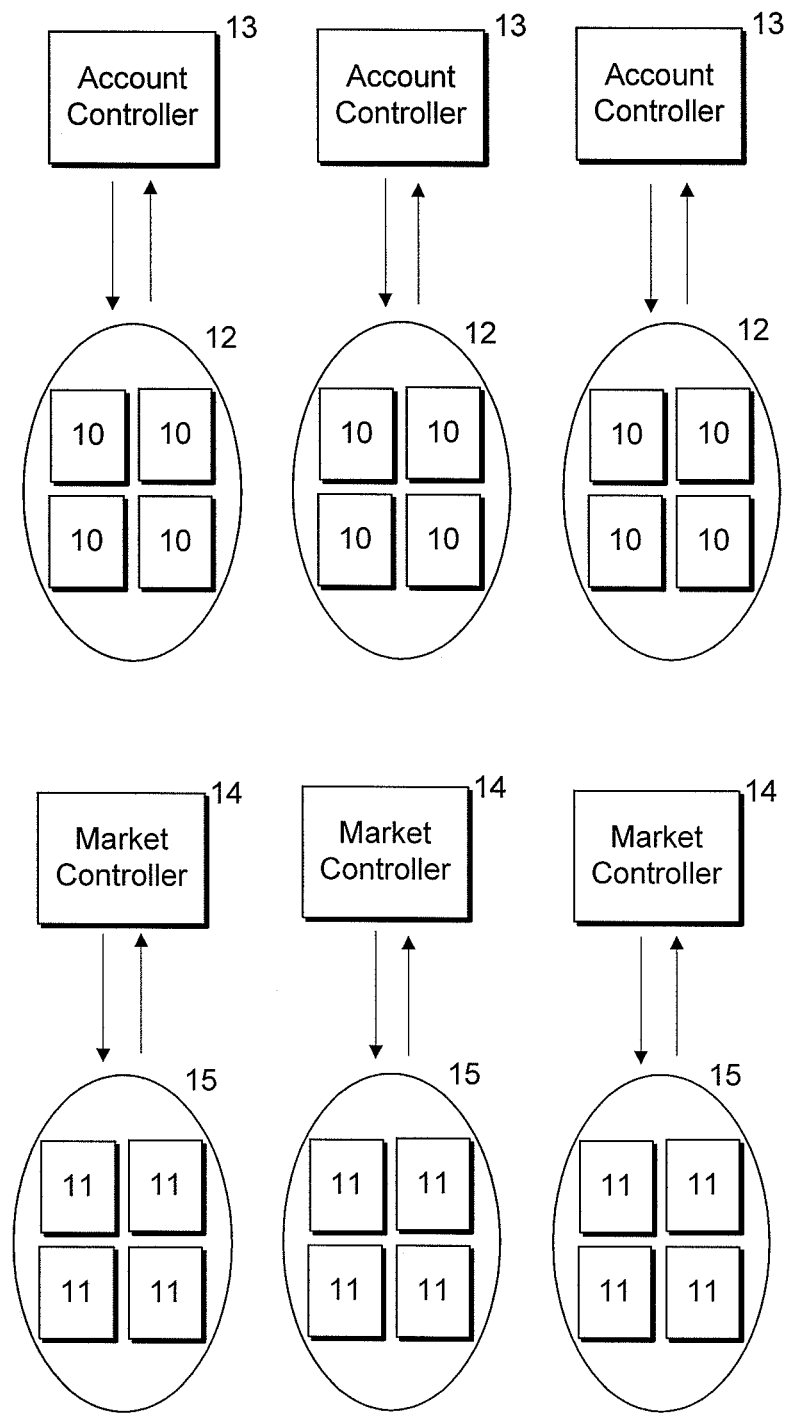
FIG. 4 illustrates the partitioning of data relating to accounts and markets within the transaction processing system according to the invention.

FIG. 4 illustrates a set of accounts 10 and a set of markets 11 used in the transaction processing system 2 for processing betting transactions. Betting is permitted through pricing screens displayed to the user. A user wishing to place a bet is assigned a user account 10 into which they may deposit money via, for example, an Internet based secure cash payment system. The transaction processing system 2 assigns each user account 10 its own unique ID.

Users have access to a plurality of betting markets 11 on which they may place bets against displayed odds. A betting market 11 may comprise, for example, the outcome of a sporting event such as a football match or a horse race. As with the user accounts 10 discussed above, the transaction processing system 2 assigns each betting market 11 its own unique ID.

Groups 12 of user accounts 10 are controlled by respective account controller applications 13. The account controller 13 for a particular group of user accounts 12 operates on the server 200 storing information relevant to the user accounts in the group in memory 202. All information relevant to a single account, and to a group of accounts associated with an account controller, is stored on, or owned by, a single server. Each account controller 13 is responsible for serving requests on its assigned user accounts 10 and for providing all account centric functions.

For example, should a user wish to perform an operation on their account 10 such as placing a bet, loading their availableto-bet balance, viewing a summary of their current bets or calculating their current exposure, i.e. how much they stand to lose from their current bets in a worst case scenario, the operation will be provided by the assigned account controller 13. The operation can be serviced by accessing the single server 200 on which that user's account 10 is located. For example, referring to FIG. 2, separate instances of account controllers run on each of the servers 200a-c, processing accounts stored on the respective servers.

Similarly, the betting markets 11 are controlled by a number of market controller applications 14, with each market controller 14 being responsible for a group 15 of betting markets 11. The market controller 14 for a particular betting market 11 operates on the server 200 storing information relevant to that betting market 11 in memory 202, as discussed above. All information relevant to a single market, and to a group of markets associated with a market controller, is stored on, or owned by, a single server. The market controllers 14 are responsible for providing all market centric functions. These functions may include bet-matching, which is discussed below. For example, referring again to FIG. 2, separate instances of market controllers run on each of the servers 200d-f, processing market information stored on the respective servers.

The number of threads running concurrently on each server 400, 200 is kept to a minimum; this assists in maintaining a high transaction rate because the processor 401, 201 of each server 400, 200 is not required to share its processing time among a large number of threads. The thread count used by the transaction processing system 2 is kept low by employing a predominately asynchronous messaging style. Therefore, instead of a thread being allocated for processing each time a message is injected into the transaction processing system 2, received messages are held on inbound queues and must wait for a thread to become available from another operation before being processed. The thread management aspects of the invention are described in more detail below.

The transaction processing system 2 according to the invention employs an architecture in which it is divided into a pipeline of processing stages connected by message queues. In general, a stage comprises a source queue for inbound events, an event handler for processing the events, a set of resource controllers for monitoring the stage's components and providing processing heuristics to a thread manager that hosts the stage, and a set of outbound queues or sinks. The stage based architecture is further described below in relation to FIGS. 5 to 10.

The resource controllers include batching resource controller modules whose function is to meet latency and throughput targets by trading one off against the other. Latency can be improved to the detriment of throughput by lowering the message batch size processed during each stage iteration. Throughput can be improved by increasing the message batch size. The batching resource controllers monitor the time taken for each stage iteration (latency) and the number of messages being processed per second (throughput) and adjust the batch size on inbound message queues accordingly.

Batching resource controllers can be applied to every stage in the system to control inbound batch size.

In addition to the batching provided by the batching resource controllers, messages can also be batched according to the data that is being operated on. Each stage may batch internally by grouping like messages together. For example, the Booker stage described in detail below may batch messages according to the account that the messages relate. Processing a number of messages that operate on the same account or on the same market can be faster than processing each message separately.

As described in GB 2356071A, users wishing to place a bet may choose either to "back" a particular outcome or to "lay" a particular outcome, i.e. to bet that the outcome will not occur. Bets to "back" and to "lay" a particular outcome may then be matched against each other. By matching opposing bets in this way, the transaction processing system 2 allows users to bet against each other, rather than against a traditional bookmaker. This provides a more flexible approach to the punter, as he or she may set the exact terms (e.g. odds, maximum amount of money) on which they are willing to bet. Once placed, a user's bet is placed in a pool of unmatched bets, which may be stored in memory 201 on the server 200 on which the relevant market controller 14 is located. The transaction processing system 2 searches the pool to find an opposing match. If there is no match available, i.e. no other user has placed a bet which can be matched against the terms offered by the user, then the bet remains in the pool unmatched. The process of bet-matching in the transaction processing system 2 will be explained in more detail below.

When a user decides to "back" or "lay" a particular outcome on a betting market 11, a message is received at a client interface server 400 detailing the user's bet. The client interface server 400 then generates and injects a message referred to as a PlaceBetRequest message into the transaction processing system 2, which gives details of the terms that the user is willing to offer to another punter. The PlaceBetRequest message will specify the market on which the bet is being offered, whether the bet is to "back" or to "lay" a particular outcome, the amount of money the user is willing to bet and the odds at which the user is willing to bet. The transaction processing system 2 is configured to process the PlaceBetRequest message and, preferably, to match it against an opposing PlaceBetRequest message which has been placed by another user. For instance, a PlaceBetRequest message of a first user wishing to back a particular outcome may be matched against a PlaceBetRequest message from a second user wishing to lay the same outcome.

This process will be described in more detail below in relation to FIGS. 5 to 10 by illustrating the flow path of two opposing PlaceBetRequest messages, placed by first and second users, through the transaction processing system 2.

The process will be described in relation to a number of software modules, referred to herein as a Director 31, Account Controller 41, 61 and Market Controller 51. The Account Controller 41, 61 and Market Controller 51 are specific instances of the account controller module 13 and market controller module 14 shown in FIG. 4.

Figure 5:
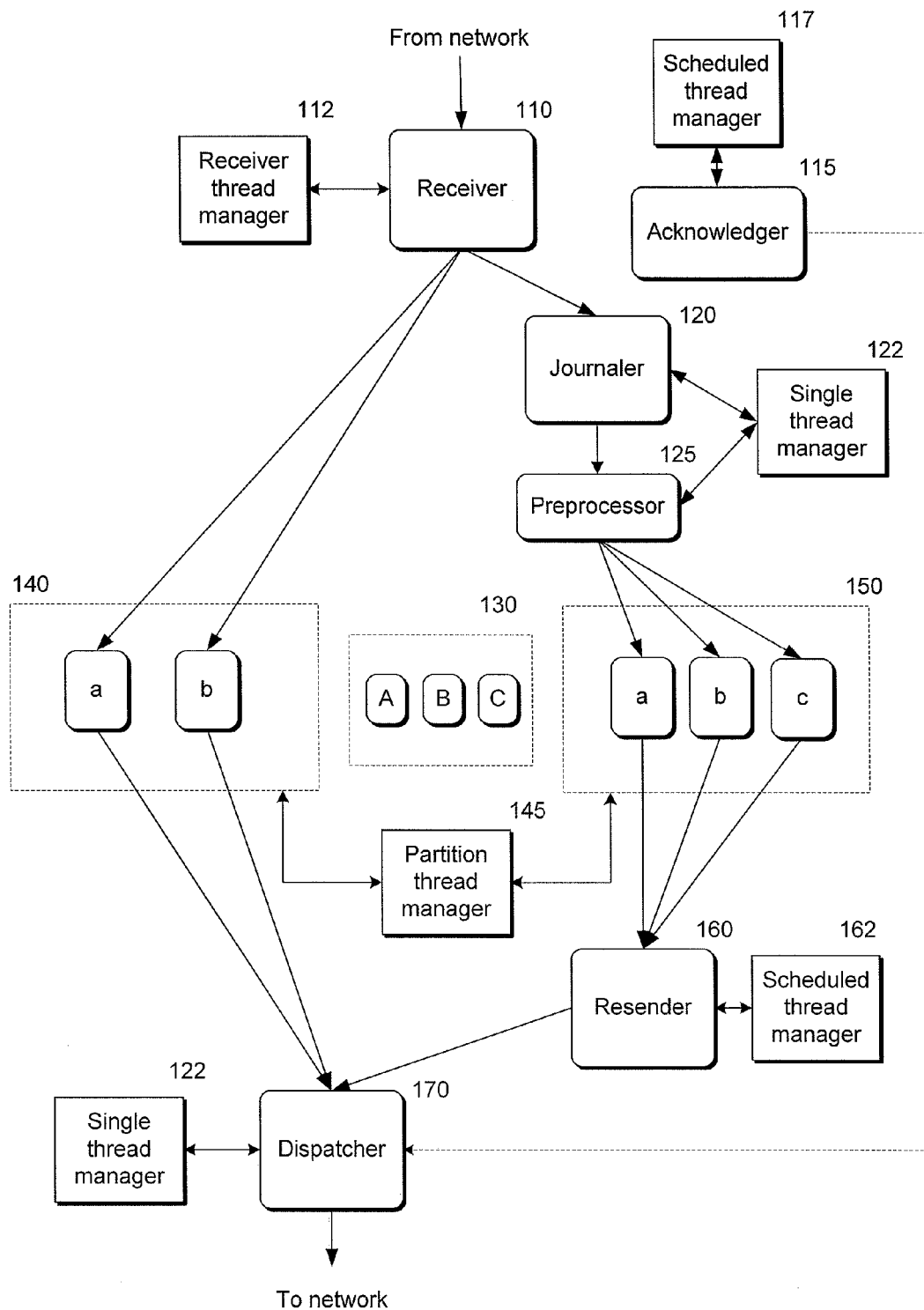
FIG. 5 is a schematic diagram illustrating the structure of a software module that provides a transaction processing function.

FIG. 5 illustrates the general structure adopted for both Account and Market Controllers, which are the core transaction processing applications. While these applications contain different logic and have different responsibilities, they share a common approach to processing transactions.

The structure comprises a receiver module (Receiver) 110, operating under the control of a receiver thread manager module (Receiver Thread Manager) 112, an acknowledger module (Acknowledger) 115, operating under the control of a scheduled thread manager 117, a journaler module (Journaler) 120 and a pre-processor module (Pre-processor) 125 operating under the control of a single thread manager module (Single Thread Manager) 122, data partitions 130, partitioned message handlers 140, 150 comprising partitioned read stages 140 and partitioned write stages 150, operating under a partition thread manager module (Partition Thread Manager) 145, a resender module (Resender) 160 operating under a scheduled thread manager module (Scheduled Thread Manager) 162 and a dispatcher module (Dispatcher) 170, also operating under the Single Thread Manager 122.

The Receiver 110 is arranged to read messages from the network and to deserialize them. The Receiver Thread Manager 112 waits on inbound network events, in turn calling the Receiver 110 when sufficient network data arrives to form a predetermined batch. The Receiver 110 is responsible for de-duplicating the messages, in other words discarding any messages that have been seen before. The necessity for de-duplication arises from the function of the Resender 160, which will be described in detail below. The resulting deserialised messages are sent to the Journaler 120. A serialised form of message is also kept and sent to the Journaler 120.

The Journaler 120 is responsible for writing the messages to a log stored on the server hard disk 403 or on a shared disk 6. The logging of messages means that during a failure, the log can be replayed and the state of memory at the time of failure restored. The messages are required to be replayed in the same order in which they were processed to ensure deterministic recovery. To achieve this, each message is assigned a sequence number by the Journaler 120, so that messages arriving at the Dispatcher can be reordered according to the order in which they arrived at the Journaler.

The Pre-Processor 125 assists in the recovery process by processing global messages on a single thread before partitioned operations, which are described in more detail below. If more than one Journaler 120 is used, the Pre-Processor 125 provides a single point at which the multiple journal message streams are coalesced back into a single serial stream. The Pre-Processor also processes serial messages such as "system online" or "system offline" that will affect all partitioned stages.

The Journaler 120 operates under the Single Thread Manager 122, as do the Pre-Processor 125 and the Dispatcher 170. This thread manager waits for a predetermined number of message forming a batch to arrive on its inbound queue, in turn invoking the appropriate stage. Stages are only invoked serially, and this thread manager is applied whenever there can only be a single instance of a stage running at any one time.

The Journaler 120 sends the messages on to the partitioned write stages 150 via the Pre-processor 125.

The partitioned write stages handle the transactional stages and operate on the data in the data partitions 130. In the case of the Account Controller, the data partitions represent accounts 10. In the case of the Market Controller, the data partitions represent markets 11. A partitioned write stage contains read/write application business logic. For example, the Exposer 44 and Booker 45 shown in FIG. 6 are partitioned write stages for an Account Controller module, whereas a Matcher 54 shown in FIG. 6 is a partitioned write stage for a Market Controller module.

Other partitioned write stages for the Account Controller module include an account creator, an account editor and an account deleter, as well as a bet deleter. For example, the account creator accepts a 'create account' message and stores the new account in an accounts data structure. In relation to the Market Controller, other partitioned write stages include a market creator, a market editor and a market deleter. For example, the market creator accepts a 'create market' message and stores the new market in a markets data structure.

The Partition Thread Manager 145 manages the allocation of threads to the partitioned write stages to ensure that a maximum of one thread is allocated per account or per market. It allows for parallelism with determinism, which means that the system can be scaled across threads and processors, but in the event of a failure, deterministic replay means that the system will always return to the state it was in prior to the failure.

For example, where a message arrives at one of the stages 150a, b, c that is to perform a read/write operation on data A, the stage acquires a thread for execution from a thread pool and processes the data A in that thread. While the write stage is operating on the data A, no other stage can operate on the same data A, so ensuring that changes are isolated from one another and that there are no distributed locks. Messages arriving to perform an operation on data A are queued until the thread operating on data A is released. The partitioned write stages 150a, b, c can however operate on other data using parallel threads of execution, so that the same or a different write stage can process data B and C in parallel to data A.

The partitioned read stages 140 also receive messages from the Receiver 110 and contain read only application business logic. In this case, a data partition can be operated on by multiple partitioned read stages at any time as long as they are not being operated on by a partitioned write stage. For example, the Partition Thread Manager queues read or write requests for data A if a write stage is operating on data A. However, if a read stage is operating on data A, further read requests are allocated threads to operate on data A. Similarly, a received write request is queued until the current read request is completed.

Examples of partitioned read stages include an account loader that accepts a 'load account' message and returns an 'account loaded' message with the account loaded from the accounts data structure, and a market loader that performs a corresponding function for a market.

The Resender 160 receives messages from the partitioned write stages 150. The purpose of the Resender is to repeatedly dispatch a message onto the network until it is told to stop, so ensuring guaranteed delivery of messages, as described in more detail below. This has advantages in the event of a failure, since messages will not be lost but will build up in a queue until the fault is rectified, for example by replacing a server. The messages will then continue to be processed. The Resender operates under the control of the Scheduled Thread Manager 162. This thread manager waits for a certain amount of time to elapse before dequeuing messages from its inbound queue.

The Dispatcher 170 receives messages from the Resender 160 and partitioned read stages 140, as well as messages from the Acknowledger 115, the function of which will be described below. It serializes the messages and writes them to the network.

While the Journaler keeps a redo log of events for replay in the event of failure, check-pointing is additionally performed by flushing the state to non-volatile storage. Check-pointing is required to permit journals to be cleared down periodically and to ensure that recovery times are not excessive. In the event of a failure, the state can be replayed from the last checkpoint.

The operations performed by each of the modules described above can proceed in parallel, so that the Receiver is reading and deserialising messages at the same time as the Journaler is processing messages received from the Receiver and at the same time as the Dispatcher is serialising previously received messages.

Figure 6A:
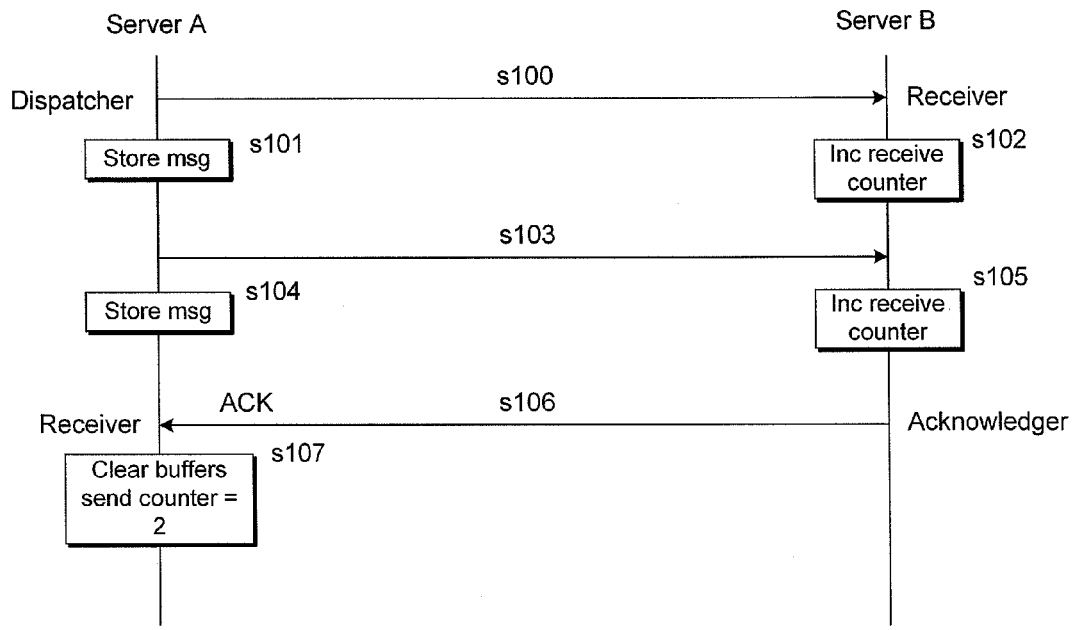
FIG. 6a illustrates a normal exchange of messages between two servers that form part of the transaction processing system according to the invention.
Figure 6B:
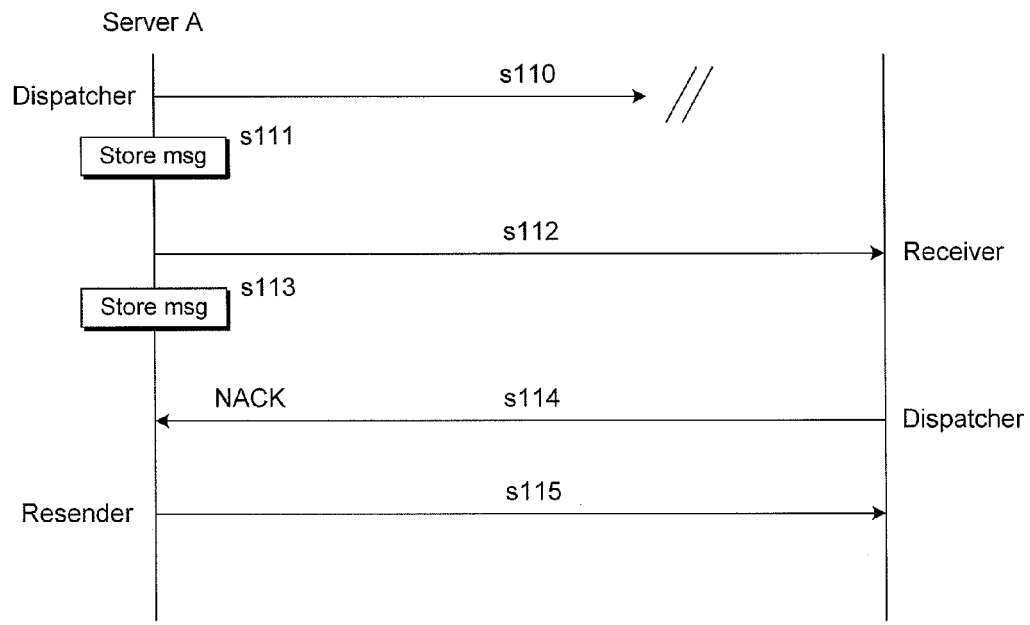
FIG. 6b illustrates message loss during an exchange of messages between two servers that form part of the transaction processing system according to the invention.
Figure 6C:
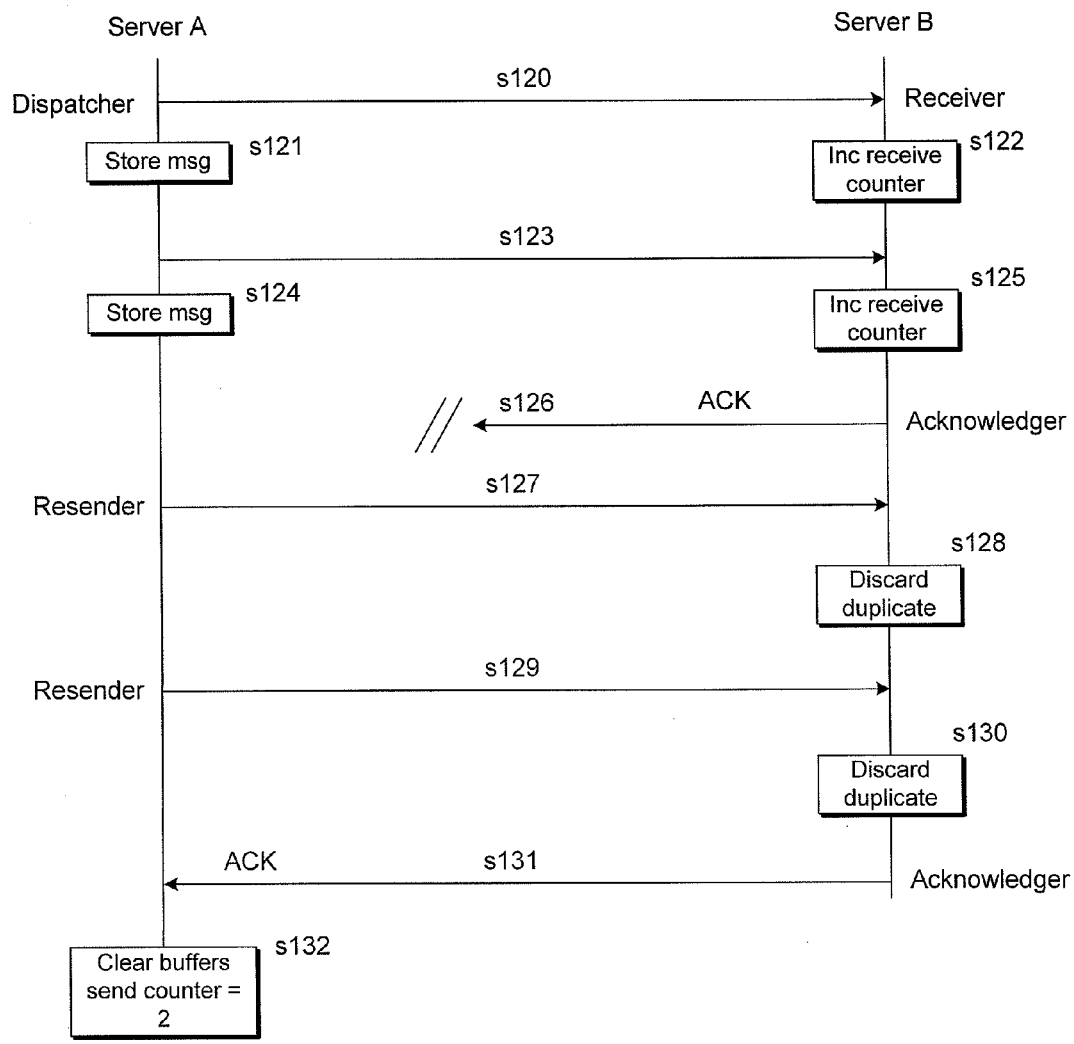
FIG. 6c illustrates de-duplication of messages during an exchange of messages between two servers that form part of the transaction processing system according to the invention.

The processes used to provide for guaranteed message delivery between servers are illustrated in FIGS. 6a to c. For example, in normal operation shown in FIG. 6a, the Dispatcher 170 at server A sets a message sequence value in accordance with a send counter, for example setting a sequence value '1', and sends the message to the Receiver 110 at server B (step s100) and stores the message in a buffer in case it needs to be retransmitted (step s101). On receipt, the Receiver 110 at Server B increments a receive counter (step s102). Server A sends a second message 2 to Server B (step s103) and stores the message (step s104). On receipt, Server B increments its receive counter (step s105). The Acknowledger 115 at Server B runs periodically picking up messages that have not been acknowledged and generates an acknowledgment message ACK for these messages. So, in this example, the Acknowledger 115 sends an ACK message for the first message (via the Dispatcher 170) to Server A (step s106). Server A clears messages 1 and 2 from its buffer and increments a send counter to a value of 2. On the next send, the Dispatcher assigns the next sequence number, in this case the value '3', to the message.

The case of a lost message is illustrated in FIG. 6b. Once again, the Dispatcher 170 at server A sends a message having a sequence number 1 to the Receiver 110 at server B (step s110) and stores the message in a buffer in case it needs to be retransmitted (step s111). However, the message is lost in transit. Server A then sends message 2 to Server B (step s112) and stores the message (step s113). After the message has been received, Server B notices that its receive counter is set to zero, while the message number is 2. The Receiver therefore generates a 'not acknowledged' NACK message, which is transmitted by the Dispatcher back to Server A containing the counter '0' (step s114). The Resender 160 at Server A responds to the NACK message by retransmitting all messages with counters greater than 0, in the way described in FIG. 6a (step s115).

FIG. 6c illustrates the process of de-duplication. First and second messages are successfully sent as illustrated in steps s100 to s105 in FIG. 6a (steps s120 to s125), resulting in the receive counter at server B being set to '2'. The Acknowledger 115 at Server B then generates an acknowledgment message ACK and sends it (via the Dispatcher 170) to Server A (step s126). However, this message is lost in transit. Having not received an ACK message within a timeout period, Server A retransmits message 1 (step s127). Server B receives the message. However, since its receive counter is at 2, it realises that it has already received this message and discards it (step s128). The same process occurs with message 2 (steps s129, s130). Server B then sends an ACK message containing the counter 2 (s131) and Server A clears its buffers and sets its send counter to 2 (step s132). The process can then continue as shown in FIG. 6a.

Figure 7:
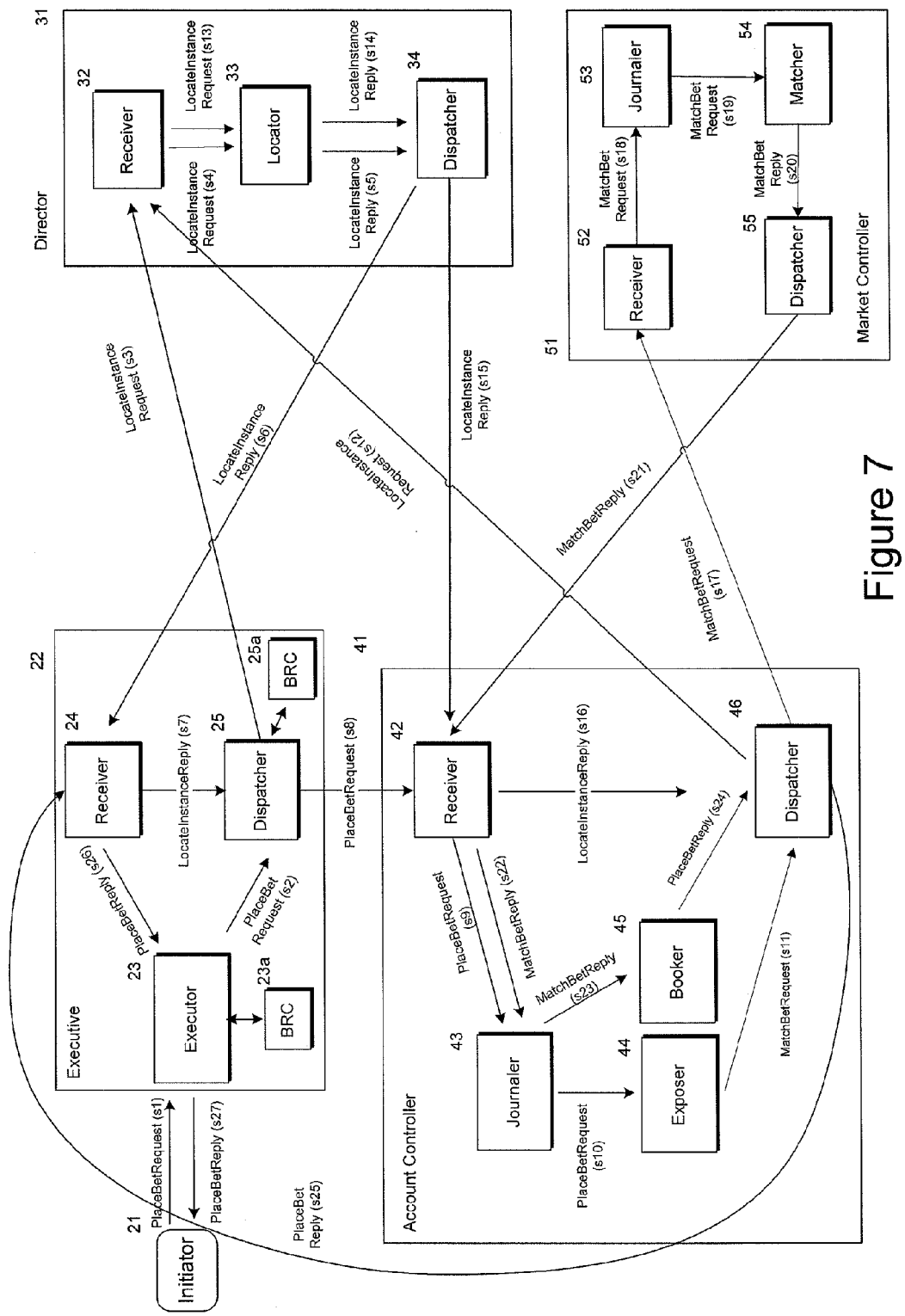
FIG. 7 illustrates a first flow of transactions through the transaction processing system according to the invention.

FIG. 7 illustrates the interrelationships between the various modules that interact to process a bet request message. As will be described in more detail below, the modules run on different servers. It will be apparent from the description below that transactions are not processed using a client-server model where a connection is set up between a client and server and communications pass backwards and forwards between them. Instead, the client passes a message to a first node or server. If further processing is required, the first server relays the message to a second server, and then to a third server, and so on, before a message concerning the requested transaction is returned to the client.

In the event of a failure of a module, for example a server running an account controller instance, messages will not be lost but will build up in a queue until the fault is rectified, for example by replacing the server. The messages will then continue to be processed.

Figure 8:
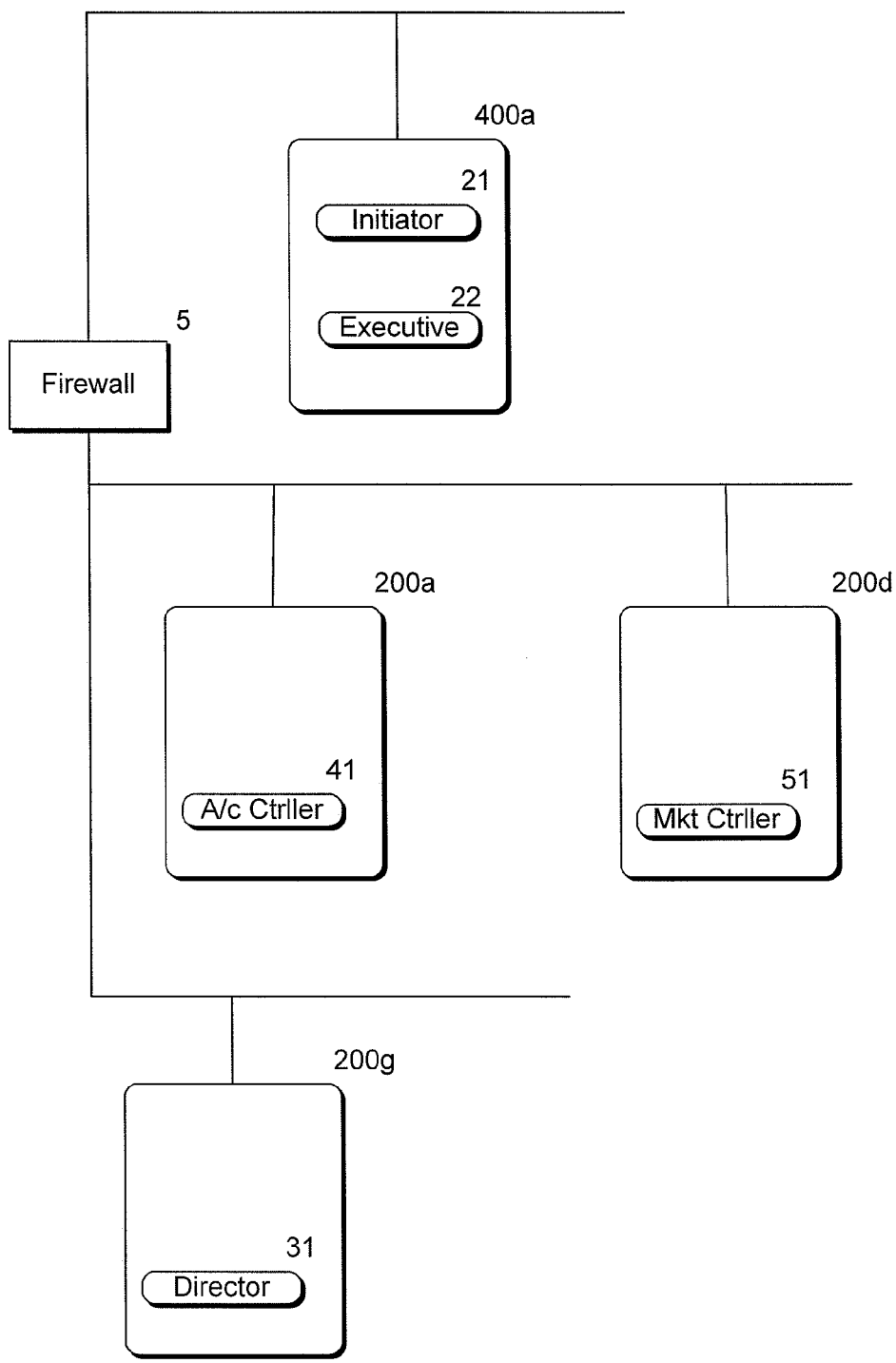
FIG. 8 is a schematic diagram illustrating instances of the transaction processing modules running on the servers shown in FIG. 2 to permit the flow of transactions illustrated in FIG. 7.

Referring to FIGS. 7 and 8, when a first user wishes to place a bet, a first PlaceBetRequest message is generated by a software module 21 referred to herein as an Initiator (step s1). The PlaceBetRequest message includes data such as the ID of the user's user account 2, the ID of the market 3 upon which they wish to place a bet, the ID of the outcome upon which the user is betting and whether they wish to "back" or "lay", the amount of money they wish to bet and the odds at which they are willing to bet.

Referring to FIG. 8, the Initiator 21 runs on an application server 400a, for example a J2EE application server, which is one of the cluster of servers 400 acting as the client interface servers. This cluster of client interface servers 400 are responsible for injecting all bet requests into the transaction processing system 2. This cluster of client interface servers 400 is also responsible for injecting other requests and messages associated with the betting system, for example requests to load a user's available-to-bet balance or requests to view all of a user's currently active bets.

The generated PlaceBetRequest message is placed on an inbound queue with other messages or requests created by the Initiator 21 and is destined for a software module referred to herein as an Executive 22, which runs on the same client interface server 400a as the Initiator 21. The Executive 22 comprises a number of processing stages. The first of these stages is a processing stage referred to as an Executor 23, which is invoked by the PlaceBetRequest. The Executive 22 further comprises a processing stage referred to herein as a Receiver 24 and a processing stage referred to herein as a Dispatcher 25. The Executor 23 is configured to dequeue messages from the inbound message queue in batches, and to process the messages on a thread allocated by a thread manager application (not shown). The thread manager may be located on one of the transaction processing servers 200. The way in which threads are allocated has already been explained above with reference to FIG. 5.

A detailed description of the processing of asynchronous requests in the transaction processing system 2 is provided below.

The PlaceBetRequest message is an asynchronous request. The use of an asynchronous request means that the Initiator 21 does not have to wait for an acknowledgement message from the Executor 23 of the Executive 22 before resuming its scheduled operations. Asynchronous messaging may be used in all of the stages of the transaction processing system 2 described below and shown in FIGS. 7 to 11.

The number of messages in the batch of messages containing the PlaceBetRequest message is controlled by a software module referred to herein as a batching resource controller (BRC) 23a referred to above.

Referring to FIG. 7, the received PlaceBetRequest message is then forwarded by the Executor 23 to the Dispatcher 25 (step s2). The Executor 23 does this by enqueueing the PlaceBetRequest message in the inbound queue of the Dispatcher 25, along with any other requests or messages which are destined for the Dispatcher 25. These other requests or messages may also have originated from the Initiator 21. As the PlaceBetRequest message is an asynchronous request, the Executor 23 may then continue with its operations. It does not have to wait for an acknowledgment message from the Dispatcher 25.

The Dispatcher 25 dequeues the PlaceBetRequest message in a batch of messages from its inbound queue. The size of the batch is determined and indicated by a controller module 25a, referred to herein as a batching resource controller 25a, which is associated with the Dispatcher 25. This controller module is configured to monitor the operation of the Dispatcher 25 and to adjust the number of requests and messages processed in each message batch as described above in relation to the batching resource controller 23a. Dequeueing the messages and requests in batches allows the Dispatcher 25 (and all other stages of the transaction processing system 2) to maximise message throughput, as processing multiple requests and messages in a batch allows cache locality and task aggregation to be performed. However, as discussed above, if the batching factor becomes too large, response times for the user (waiting for a response to their bet request) will be significantly lengthened.

All batching resource controllers in the transaction processing system 2 operate in the same manner. However, batching can be performed based on different criteria depending on the stage reached. For example, at the Receiver stage, batching can be based on network latency, at the Journaler it can be based on disk latency, while at the Exposer, it can be based on the number of requests per account. Although, in this example, a separate batching resource controller is associated with each stage, in an alternative embodiment there may be a single batching resource controller on each server which is responsible for controlling all batching operations on that server. For clarity, batching resource controllers are not shown as being associated with each stage in this embodiment. In the description below, operations will also be described below using the terms "forwarding" and "receiving", while it will be understood that these operations involve queuing and batch control.

Messages dequeued by the Dispatcher 25 are divided into groups to allow them to be processed in batches. The PlaceBetRequest message is batched with all other messages destined for the Account Controller 41 assigned to the user account of the user who caused the Initiator 21 to generate the PlaceBetRequest message. Other messages assigned to the batch may include other PlaceBetRequest messages, requests to view the user's available-to-bet balance, etc, as previously described.

At this stage, the Executive 22 does not know which one of the account controllers 13 shown in FIG. 4 is assigned to the user's user account 10, and hence does not know where to dispatch the PlaceBetRequest message to. The Dispatcher 25 therefore generates a LocateInstanceRequest message (step s3) in order to ascertain the correct Account Controller 41. Meanwhile, the PlaceBetRequest message is stored at the Executive 22 for later transmission. For example, the PlaceBetRequest message may be stored in memory 402 located on the client interface server 400*a*. As discussed above, all of the messages in the batch containing the PlaceBetRequest message are destined for the same Account Controller 41, and therefore only a single LocateInstanceRequest message needs to be generated for that batch. The LocateInstanceRequest message is enqueued in a queue with any other messages (for example LocateInstanceRequest messages associated with other user accounts) destined for the Director 31.

The Director 31 comprises a Receiver stage 32, a Locator stage 33 and a Dispatcher stage 34. It also comprises a Journaler (not shown) in a corresponding way to the other modules, but this has been omitted for clarity. Referring to FIG. 8, the Director 31 may run on a server 200*g*, which is one of the cluster of transaction processing servers 200. The Receiver 32 dequeues the LocateInstanceRequest message in a batch of messages.

The Receiver 32 enqueues the LocateInstanceRequest message in a queue with all other messages destined for the Locator 33 (step s4). The Locator 33 then dequeues the LocateInstanceRequest message from the queue in a batch of messages, for example with other LocateInstanceRequest messages, under the control of a Batching Resource Controller 33*a*. The Locator 33 is configured to look up the address of the Account Controller 41 assigned to the user account specified in the LocateInstanceRequest message from a list stored in memory 202 of the server 200*g* on which the Director 31 is located. The Locator 33 then creates a LocateInstanceReply message (step s5), which contains the address information of the assigned Account Controller 41 and enqueues the message along with any other messages destined for the Dispatcher stage 34 of the Director 31.

The LocateInstanceReply message is dequeued by the Dispatcher 34, and is enqueued in a queue along with any other messages destined for the Receiver 24 of the Executive 22 (step s6). Once dequeued by the Receiver 24, the LocateInstanceReply message is forwarded to the inbound queue of the Dispatcher 25 (step s7).

At this stage, the pending PlaceBetRequest message that triggered the LocateInstanceRequest message is retrieved from memory 401 of the client interface server 400*a* and is forwarded to the Account Controller 41 specified in the LocateInstanceReply message. The address of the Account Controller 41 is cached by the Executive 22 to avoid any further lookups. The Account Controller may run on a server 200*a*, which is one of the transaction processing servers 200. The server 200*a* is the server on which all data relevant to the user's user account is stored.

Similarly to the Executive 22 and the Director 31, the Account Controller 41 comprises a Receiver stage 42 and a Dispatcher stage 46. The Account Controller 41 also comprises a Journaler stage 43, an Exposer stage 44 and a Booker stage 45. The PlaceBetRequest message is received by the Receiver 42 (step s8) and forwarded to an inbound queue of the Journaler 43 (step s9).

The processing stages of the Account Controller 41 operate in a manner similar to those described above in relation to the stages of the Executive 22 and the Director 31. Messages are dequeued from an inbound queue of messages. Messages on the inbound queue have been placed there by the previous processing stage. The messages are then processed and either placed onto the inbound queue of the next stage or used to create a new message, which is placed onto the inbound queue of the next stage. These processes are generally referred to herein as enqueuing and dequeueing.

At the Journaler 43 the PlaceBetRequest message is appended to a non-volatile log which could, for example, be stored on a shared hard disk 6. Alternatively, it may be stored at a hard disk 203 within each server 200, thereby increasing the speed at which the information stored in a log on each server 200 may be recovered. The PlaceBetRequest is given a unique sequence number in the log for replay if required.

Journaling received messages in this manner means that, in the event of a system failure, the transaction processing system 2 may return to a definite point, i.e the stage at which a received message was last recorded by the Journaler 43 of the Account Controller 41. The PlaceBetRequest message is forwarded from the Journaler 43 to the Exposer 44 (step s10).

At the Exposer stage 44, the PlaceBetRequest is processed to calculate the maximum possible exposure of the bet, which is a calculation that determines the maximum liability of the user when the user back or lays a particular outcome. For example, if the bet is to "back" a particular outcome at odds of 2/1 (digital odds of 3) with a stake of £5, the user stands to lose £5 if they lose the bet. However, if the bet is to "lay" a particular outcome at odds of 2/1 with a maximum bet of £5, then the user stands to lose £10 if they lose the bet.

Exposure calculations are carried out by the Exposer 44 and are processed in batches. Therefore, if there are a plurality of PlaceBetRequest messages for a particular user account, the exposure of all the bets will be calculated in a single operation.

The Exposer stage 44 checks the calculated exposure against the available to bet balance of the user's user account. If the user account contains enough money to cover the exposure of the user's active bet(s), the Exposer 44 creates a MatchBetRequest message and forwards the MatchBetRequest message to the Dispatcher 46 (step s11). If the user account does not contain enough money to cover the exposure of the bet, a message may be returned to the user via the Executive 22 and Initiator 21 to inform the user that there are insufficient funds available in their account.

The process at the Dispatcher 46 is similar to that described above with reference to the Dispatcher 24 of the Executive 22. The Account Controller 41 does not know which market controller 14 is assigned to the betting market 11 specified by the MatchBetRequest. The Dispatcher 46 therefore creates a LocateInstanceRequest message and sends it the Director 31 (step s12), which forwards the message to the Locator 33 (step s13). The Locator 33 looks up the assigned Market Controller 51 from a list in a similar way to that described above in relation to the look up of the Account Controller 41. Meanwhile, the MatchBetRequest message is stored in the Account Controller 41 for later transmission. The MatchBetRequest may be stored, for example, in RAM 202 located on the server 200 on which the Account Controller 41 is located. The Assigned Market Controller 51 is located by the Locator 33, which forwards a LocateInstanceReply message to the Dispatcher 34 (step s14). The address of the Market Controller 51 is forwarded to the Receiver 42 of the Account Controller 41 in the LocateInstanceReply message created by the Dispatcher 34 of the Director 31 (step s15).

The LocateInstanceReply message is then forwarded by the Receiver 42 of the Account Controller 41 to the Dispatcher 46 (step s16). At this point, the pending MatchBetRequest that triggered the LocateInstanceRequest message is retrieved from memory 201 on the server 200 and is forwarded by the Dispatcher 46 to the correct Market Controller 51 (s17). As with the Account Controller 41, the address of the Market Controller 51 is cached by the Executive 22 to avoid the need to look up its address again.

As shown in FIG. 8, the Market Controller 51 is located on a server 200d, which is one of the transaction processing servers 200, and comprises a Receiver stage 52, a Journaler stage 53, a Matcher stage 54 and a Dispatcher stage 55. The stages of the Market Controller 51 enqueue and dequeue messages as described in relation to the Executive 22, Director 31 and Account Controller 41. The MatchBetRequest message is received by the Receiver 52 and forwarded to the Journaler 53 (step s18). At the Journaler 53, the MatchBetRequest message is appended to a non-volatile log stored on, for example, a hard disk in a manner similar to that described in relation to the logging of the PlaceBetRequest message at the Journaler 43 of the Account Controller 41. As previously discussed, the non-volatile log may, for example, be stored on the server 200d on which the Market Controller 51 is located, or may be the shared disk 6 or another disk connected to the Market Controller 51 via a network connection. The MatchBetRequest message is then forwarded to the Matcher 54 (step s19).

At the Matcher 54, the MatchBetRequest message causes the Matcher 54 to trigger a search through a pool of any unmatched bets which have already been placed on that betting market 3. The pool of unmatched bets may be stored, for example in memory 202 that is part of the server 200d. The purpose of the search is to find a bet which offers terms opposing that of the terms offered by the MatchBetRequest message. In this example, the bet pool is empty and so there are no matchable bets available. The user's bet is therefore added to the pool of unmatched bets unmodified. The Matcher 54 then creates a MatchBetReply message which details information concerning the matching process for that bet. In this case, as the pool is empty, the MatchBetReply message details that there are no available matches for the bet.

Matching of bets is carried out in batches; if there are a plurality of MatchBetRequests on a particular betting market 11, the matching process for all of the MatchBetRequests will occur in a single operation.

The MatchBetReply message is forwarded by the Matcher 54 to the Dispatcher 55 (step s20), which in turn forwards the message to the Receiver 42 of the Account Controller 41 (step s21). The Receiver 42 forwards the MatchBetReply message to the Journaler 43 (step s22), where the MatchBetReply message is appended to the non-volatile log before being forwarded to the Booker 45 (step s23).

At the Booker 45, the information contained in the MatchBetReply message is used, for example, to update the status of the user's bet from "unprocessed" to "processed". The Booker 45 is also configured to store any match information. However, in the case of this MatchBetReply message, there is no match information as there were no suitable MatchBetRequests in the bet pool. The status of the user's bet may be stored, for example, in memory 202 such as RAM on the server 200a running the Account Controller 41. The Booker 45 creates a PlaceBetReply message and forwards it to the Dispatcher 46 (step s24). From the Dispatcher 46, the PlaceBetReply is forwarded to the Executor 23 of the Executive 22 via the Receiver 24 (steps s25, s26).

At this point, the PlaceBetReply message is placed onto the inbound queue of the Initiator 21, ready to be dequeued (step s27). The result of the bet placement may then be returned to the user via the Initiator 21.

Referring to FIGS. 9 and 10, a second user places a bet opposing that placed by the first user via the user website. This causes a second PlaceBetRequest message to be injected into the Executor 23 of the Executive 22 (step s1). The second PlaceBetRequest message follows a path through the transaction processing system 2 as described above in relation to the passage of the PlaceBetRequest message associated with the bet of the first user. Steps s1 to s19 are the same as those described above.

Upon reaching the Matcher 54 in the Market Controller 51, the MatchBetRequest message associated with the second user's bet causes the Matcher 54 to trigger a search for a potential match to the MatchBetRequest message in the pool of unmatched bets stored in RAM 202, as previously discussed in relation to the MatchBetRequest message associated with the bet of the first user. This time, the search is successful and the MatchBetRequest associated with the bet of the second user is matched with the first MatchBetRequest associated with the bet of the first user.

The Matcher 54 then generates a MatchBetReply message detailing information concerning the match, and forwards the MatchBetReply message to the Dispatcher 55 (step s20a) and then to the Receiver 62 of an Account Controller 61 assigned to the user account of the second user (step s21a). Referring to FIG. 11, the Account Controller 61 is located on a server 200b, which is one of the network of servers 200 forming the transaction processing system. The server 200b is the server on which all information associated with the second user's user account is stored, for example in RAM 202.

The MatchBetReply message then flows through the transaction processing system 2 in the manner shown in FIG. 9. This is similar to that described in relation to the flow of the MatchBetReply message associated with the bet of the first user. Specifically, the MatchBetReply message is stored in non-volatile memory 203 by a Journaler 63 and is forwarded to a Booker 65, which updates the status of the second bet in the Account Controller 61 from "unprocessed" to "processed". The Booker 65 also stores the match information contained in the MatchBetReply message and constructs a PlaceBetReply message, which is forwarded to the Initiator 21 via a Dispatcher 66 and the Receiver 23 and Executor 22 of the Executive 21 (step s24 to s27).

The PlaceBetReply may then be relayed back to the user web page via the Initiator 21 on the client interface server 400a. This provides both the first and second users with confirmation that their bets have been successfully matched against an opposing bet.

In addition to creating a MatchBetReply message as described above, the Matcher 54 additionally generates a MatchedBetEvent message which is forwarded to the Dispatcher 55 of the Market Controller 51 (step s20b). The MatchedBetEvent message is to be forwarded to the Account Controller 41 assigned to the user account of the first user to inform it that the PlaceBetRequest message associated with the bet of the first user has now been successfully matched. However, at this stage, the Market Controller 51 does not know the address of the Account Controller 41 associated with the first user's user account. The MatchBetEvent message is therefore stored at the Market Controller 51, for example in memory 202 on the server 200b, and the Dispatcher 55 generates a LocateInstanceRequest message (s21b) to look up the address of the Account Controller 41 from a list accessed by the Director 31. This list may be stored in RAM 202 comprised as part of the server 200g on which the Director 31 is located.

The LocateInstanceRequest message is received by the Receiver 32 and forwarded to the Locator 33 to look up the address of the Account Controller 41 (s22b). The Locator 33 generates a LocateInstanceReply message containing the address of the Account Controller 41 and forwards it to the Receiver 52 of the Market Controller 51 via the Dispatcher 34 (steps s23b, s24b). The Receiver 52 of the Market Controller 51 then forwards the LocateInstanceReply message to the Dispatcher 55 (step s25b). At this stage, the pending MatchBetEvent message is retrieved from memory 201 and is forwarded to Receiver 42 of the Account Controller 41 (step s26b). The address of the Account Controller 41 is cached by the Market Controller 51 to avoid the need to look it up again in the future.

The received MatchedBetEvent message is forwarded to the Journaler 43 (step s27b) and is appended to non-volatile storage with a unique reference number in a manner previously described. The MatchedBetEvent message is then forwarded to the Booker 45 (step s28b) and is used to update the status of the bet on the Account Controller 41. This data may be stored in RAM 202 on the server 200a running the Account Controller 41.

In this way, the bets placed by the first and second users are successfully matched together.

As transactions are processed, data held within the transaction processing system changes rapidly. The new data needs to be notified to clients, for example, the market view needs to be updated for users. These changes are propagated to clients that require the information by pushing the changes to existing data, referred to as deltas, to the clients, rather than responding to client requests.

The above-described embodiments and alternatives may be used either singly or in combination to achieve the effects provided by the transaction processing system.

The above described system according to the invention generally conforms to the ACID principles of transaction processing systems. These are that transactions need to have the following properties:

Atomicity. An atomic transaction is a series of operations where either all or none of the operations succeed. If the series of operations fails at some point before completion, then any operations that complete prior to the failure need to be rolled back. In the transaction processing system according to the invention, the transactions are known up front, and everything is stored in volatile memory. Unlike conventional systems, logging occurs at the transaction level rather than the operations level, so there is no need for UNDO logging, in which all completed operations are logged, and the UNDO log is inspected to remove from non-volatile storage changes that were written before a transaction completed.

For example, the "bet placement" transaction is logged, not the series of operations that underlie it, such as "write old exposure", "write new exposure", "write new bet" etc.

In the case where a transaction is captured, execution begins and there is a failure before all operations in the transaction complete, the state is thrown away, and the journal, also known as the REDO log, is replayed to restore the state.

To ensure that state can be successfully restored by log replay, the stages are deterministic. For example, bets arrive in a specific order and are logged. Assume:
1. Bet 1 (£10)
2. Bet 2 (£15)
3. Bet 3 (£20)

After processing in a deterministic way, the single possible state is as follows:
1. Bet 1 (£10 matched with Bet 2)
2. Bet 2 (£10 matched with Bet 1, £5 matched with Bet 3)
3. Bet 3 (£5 matched with Bet 2, £15 unmatched)

It is clear that if the bet matching stage was non-deterministic, then any number of states would be possible. For example, if Bet 3 were to be processed before Bets 1 and 2, then one possible state would be:
1. Bet 1 (£10 matched with Bet 3)
2. Bet 2 (£10 matched with Bet 3, £5 unmatched)
3. Bet 3 (£10 matched with Bet 1, £10 matched with Bet 2)

Since log replay can be a time consuming process, some embodiments of the invention include a high availability mechanism, for example log tailing.

Consistency. This means that there must be no violation of any application defined integrity constraints. Assuming that a system is in a consistent state before a transaction executes, it must also be in a consistent state afterwards.

For example, if a user has a bet for £10, then the unmatched portion and the matched portion must add up to £10.

In embodiments of the system according to the invention, weak consistency is applied. The system will become consistent eventually, but at any instant in time it may be inconsistent. For example, an Account Controller may have a record of a £10 unmatched bet, and a Market Controller may have a record of £5 of that bet matched. While the Account Controller has no record of the £5 matched or unmatched, the message in transit from the Market Controller detailing the match means that the Account Controller will eventually record the £5 matched and unmatched values. This is guaranteed by state and messaging guarantees as previously described.

Isolation. This property refers to the multiple executing operations not overlapping, so that while they may have executed concurrently, they appear to have executed in series. Major functions in the transaction processing system require exclusive access to accounts and events. To achieve isolation, execution units are assigned to individual entities, so access is inherently serialised and transactions are isolated from one another. For example, a single execution unit may own a particular Account or a particular Market, as opposed to client sessions acquiring and releasing locks on particular pieces of data.

Durability. Once a transaction has completed successfully, it must not be lost, even in the event of a system shutdown. Changes are therefore written, or journalled, to disk. As described above, only the full transaction is logged in this way, not the individual operations that make up the transaction.

Message counters are also logged, to provide for messages lost, out of order or duplication.

Modifications and variations to the above described embodiments would be apparent to the skilled person while still falling within the scope of the claims.

The invention claimed is:

1. A method of transaction processing in a system comprising a plurality of distributed nodes, in which data is held in a plurality of data partitions, data in respective partitions being associated with respective single ones of the nodes, the system further comprising:
    a plurality of controllers for controlling a group of data partitions, each controller comprising a plurality of write stages for performing operations on the data in the data partitions; and
    a thread manager for allocating threads of execution to the write stages, wherein the thread manager is arranged to allocate at most a single thread for operating on data in a given data partition, the method comprising:
    receiving a message at a first one of the plurality of controllers, the message defining an operation to be performed on data associated with a given data partition;
    queuing the message for processing by one of the plurality of write stages; and
    permitting the write stage to process the message, in the event that a thread of execution is available for the given data partition.

2. The method of claim 1, further comprising:
    forwarding the message to a second one of the plurality of controllers for subsequent processing.

3. The method of claim 1, further comprising, prior to sending the message to the first controller, determining an address of the controller that is assigned to the given data partition for which the message is intended.

4. The method of claim 1, further comprising permitting a plurality of read stages to operate on the data in a given partition in parallel.

5. The method of claim 4, wherein the plurality of read stages are permitted to operate on the data in the given partition only if a write stage is not operating on the data in the given partition.

6. The method of claim 1, further comprising journaling received messages on receipt.

7. The method of claim 6, further comprising assigning a sequence number to a received message.

8. The method of claim 1, further comprising batching a received message with a plurality of other received messages.

9. The method of claim 8, wherein the batching is performed based on criteria that are dependent on the processing stage at which the batching is performed.

10. The method of claim 8, wherein the batching is performed in accordance with at least one of network latency, disk latency and the data to be processed.

11. The method of claim 8, further comprising grouping the messages in accordance with the controller associated with the data partitions for which the messages are destined.

12. The method of claim 1, wherein the data in a plurality of data partitions associated with a single controller is stored at a single one of the nodes.

13. The method of claim 1, wherein the data in a first data partition defines an account associated with a user.

14. The method of claim 13, wherein a first controller comprises an account controller for controlling operations relating to a plurality of accounts.

15. The method of claim 13, wherein the data in a second data partition comprises a market on which a plurality of users can place bets.

16. The method of claim 15, wherein a second controller comprises a market controller for controlling operations relating to a plurality of markets.

17. The method of claim 1, wherein messages are transmitted asynchronously.

18. The method of claim 1, wherein the nodes comprise servers.

19. The method of claim 1, further comprising:
    receiving a plurality of said messages at the first controller;
    assigning a sequence number to each received message and storing the messages and the assigned sequence numbers;
    forwarding a message processed by the write stage to a second one of the plurality of controllers for subsequent processing;
    wherein if a failure occurs in a communication between the first controller and the second controller, stored messages are retrieved for re-forwarding to the second controller in the order of their assigned sequence numbers.

20. A non-transitory computer readable medium comprising computer readable instructions for performing a method of transaction processing in a system comprising a plurality of distributed nodes, in which data is held in a plurality of data partitions, data in respective partitions being associated with respective single ones of the nodes, the system comprising:
    a plurality of controllers for controlling a group of data partitions, each controller comprising a plurality of write stages for performing operations on the data in the data partitions; and
    a thread manager for allocating threads of execution to the write stages, wherein the thread manager is arranged to allocate at most a single thread for operating on data in a given data partition, the computer readable instructions comprising:
    first instructions for receiving a message at a first one of the plurality of controllers, the message defining an operation to be performed on data associated with a given data partition;
    second instructions for queuing the message for processing by one of the plurality of write stages; and
    third instructions for permitting the write stage to process the message, in the event that a thread of execution is available for the given data partition.

21. The non-transitory computer readable medium of claim 20, the computer readable instructions further comprising:
    fourth instructions for forwarding the message to a second one of the plurality of controllers for subsequent processing.

22. The non-transitory computer readable medium of claim 20, wherein the first instructions are for receiving a plurality of said messages at the first controller, and for assigning a sequence number to each received message and storing the messages and the assigned sequence numbers, the computer readable instructions further comprising:

fourth instructions for forwarding the message to a second one of the plurality of controllers for subsequent processing.

23. Apparatus for transaction processing in a system comprising a plurality of distributed nodes, in which data is held in a plurality of data partitions, data in respective partitions being associated with respective single ones of the nodes, the system comprising:
- a plurality of controllers for controlling a group of data partitions, each controller comprising a plurality of write stages for performing operations on the data in the data partitions; and
- a thread manager for allocating threads of execution to the write stages, wherein the thread manager is arranged to allocate at most a single thread for operating on data in a given data partition, the apparatus comprising:
- a receiver to receive messages at a first one of the plurality of controllers, the messages defining operations to be performed on data associated with a given data partition; and
- a plurality of write stages for processing the messages, wherein a write stage is arranged to process one or more messages in the event that a thread of execution is available for the given data partition and in the event that a thread of execution is not available, the apparatus being arranged to place the messages in a queue.

24. The apparatus of claim 23, further comprising a dispatcher for forwarding the message to a second one of the plurality of controllers for subsequent processing.

25. The apparatus of claim 23, wherein data relating to an account is stored on a single server.

26. The apparatus of claim 25, further comprising an account controller for controlling a group of accounts.

27. The apparatus of claim 25, further comprising a thread manager for allocating a single thread to a first write stage operating on a single account or a single market.

28. The apparatus of claim 27, wherein a second write stage requesting access to the single account or the single market is denied access until the single thread is released.

29. The apparatus of claim 27, wherein the first and/or second write stage is configured to process a batch of messages relating to a single account or market in a single operation.

30. The apparatus of claim 23, wherein data relating to a market is stored on a single server.

31. The apparatus of claim 30, further comprising a market controller for controlling a group of markets.

32. The apparatus of claim 23, further comprising a pre-processor for processing messages that affect a plurality of write stages.

33. The apparatus of claim 30, wherein the pre-processor is arranged to generate a single message stream from multiple journaled message streams.

34. The apparatus of claim 23, further comprising means for resending messages from a first node to a second node in response to a notification that a message has not been received.

35. The apparatus of claim 23, further comprising a cluster of data directors for serving heavily requested data.

36. The apparatus of claim 23, wherein the apparatus is configured to journal transactions in non-volatile memory and to journal operations that make up transactions in volatile memory.

37. The apparatus of claim 23, wherein the receiver is arranged to receive a plurality of said messages at the first controller, and to assign a sequence number to each received message and storing the messages and the assigned sequence numbers, the apparatus further comprising:
- a dispatcher for forwarding the message to a second one of the plurality of controllers for subsequent processing;
- wherein if a failure occurs in a communication between the first controller and the second controller, stored messages are retrieved for re-forwarding to the second controller in the order of their assigned sequence numbers.

* * * * *